(12) United States Patent
Busch et al.

(10) Patent No.: US 8,788,837 B2
(45) Date of Patent: Jul. 22, 2014

(54) AUTHENTICATED TRANSMISSION OF DATA

(76) Inventors: Christoph Busch, Gjovik (DE); Daniel Hartung, Gjovik (DE)

( * ) Notice: Subject to any disclaimer, the term of this patent is extended or adjusted under 35 U.S.C. 154(b) by 146 days.

(21) Appl. No.: 13/511,042

(22) PCT Filed: Nov. 30, 2010

(86) PCT No.: PCT/EP2010/007439
§ 371 (c)(1),
(2), (4) Date: Aug. 2, 2012

(87) PCT Pub. No.: WO2011/063992
PCT Pub. Date: Jun. 3, 2011

(65) Prior Publication Data
US 2012/0297464 A1  Nov. 22, 2012

(30) Foreign Application Priority Data
Nov. 30, 2009  (DE) .......................... 10 2009 055 947

(51) Int. Cl.
G06F 21/00  (2013.01)
(52) U.S. Cl.
USPC ................................ 713/186; 726/5; 726/29
(58) Field of Classification Search
None
See application file for complete search history.

(56) References Cited

U.S. PATENT DOCUMENTS

| | | | |
|---|---|---|---|
| 4,993,068 A | 2/1991 | Piosenka et al. | |
| 6,038,315 A * | 3/2000 | Strait et al. | 713/183 |
| 6,363,485 B1 * | 3/2002 | Adams et al. | 713/186 |
| 7,526,653 B1 | 4/2009 | Vogel et al. | |
| 7,620,818 B2 * | 11/2009 | Vetro et al. | 713/186 |
| 8,325,994 B2 * | 12/2012 | Davida | 382/115 |
| 8,364,131 B2 * | 1/2013 | Nagaraja | 455/415 |
| 8,384,515 B2 * | 2/2013 | Rachlin | 340/5.82 |
| 8,433,920 B2 * | 4/2013 | Wang et al. | 713/186 |
| 2004/0148509 A1 | 7/2004 | Wu | |
| 2006/0123239 A1 * | 6/2006 | Martinian et al. | 713/186 |
| 2006/0123241 A1 * | 6/2006 | Martinian et al. | 713/186 |
| 2007/0174633 A1 * | 7/2007 | Draper et al. | 713/186 |
| 2008/0168268 A1 * | 7/2008 | Chabanne | 713/150 |
| 2008/0235515 A1 * | 9/2008 | Yedidia et al. | 713/186 |
| 2010/0017618 A1 * | 1/2010 | Golic et al. | 713/186 |
| 2010/0066493 A1 * | 3/2010 | Rachlin | 340/5.82 |

FOREIGN PATENT DOCUMENTS

| | | |
|---|---|---|
| DE | 10 2005 008 257 A1 | 8/2006 |
| WO | WO 01/15378 A1 | 3/2001 |
| WO | WO 02/05077 A2 | 1/2002 |
| WO | WO 02/078249 A1 | 10/2002 |
| WO | WO 2004/019188 A2 | 3/2004 |

OTHER PUBLICATIONS

Kanade, D. Petrovska-Delacr'etaz, and B. Dorizzi, "Cancelable Iris Biometrics and Using Error Correcting Codes to Reduce Variability in Biometric Data," in IEEE Computer Society Conference on Computer Vision and Pattern Recognition, Jun. 2009.*

Schneier, Bruce "Applied Cryptography. $2^{nd}$ Edition", Ch. 18.14, (1996) John Wiley & Sons, Inc.

* cited by examiner

Primary Examiner — Michael R Vaughan
(74) Attorney, Agent, or Firm — Fulbright & Jaworski LLP

(57) ABSTRACT

A method for transmitting data confirmed by at least one person (KND), wherein data (TOR) to be transmitted are received and/or generated by an input device (BSW), wherein the input device (BSW) can be operated by the person (KND). A configuration for performing the method and a computer program for implementing the steps are also provided.

9 Claims, 8 Drawing Sheets

|     | 1 | 2 | 3 | 4 | 5 | 6 |
|-----|---|---|---|---|---|---|
| CBV | 1 | 0 | 1 | 1 | 1 | 0 |

+

|   | 1 | 2 | 3 | 4 | 5 | 6 |
|---|---|---|---|---|---|---|
| f | 0 | 0 | 1 | 0 | 0 | 0 |

=

|      | 1 | 2 | 3 | 4 | 5 | 6 |
|------|---|---|---|---|---|---|
| CBV' | 1 | 0 | 0 | 1 | 1 | 0 |

Fig. 6

| 000000 | 110100 | 011010 | 101001 | 101110 | 110011 | 011101 | 000111 |
| 000001 | 110101 | 011011 | 101000 | 101111 | 110010 | 011100 | 000110 |
| 000010 | 110110 | 011000 | 101011 | 101100 | 110001 | 011111 | 000101 |
| 000100 | 110000 | 011110 | 101101 | 101010 | 110111 | 011001 | 000011 |
| 001000 | 111100 | 010010 | 100001 | 100110 | 111011 | 010101 | 001111 |
| 010000 | 100100 | 001010 | 001001 | 111110 | 100011 | 001101 | 010111 |
| 100000 | 010100 | 111010 | 001001 | 001110 | 010011 | 111101 | 100111 |

Figur 7

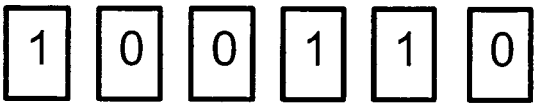
Fig. 8
Fig. 9
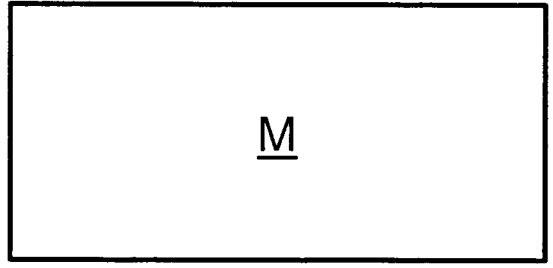

|     | 1 | 2 | 3 | 4 | 5 | 6 |
|-----|---|---|---|---|---|---|
| CBV'| 1 | 0 | 0 | 1 | 1 | 0 |

−

| f | 0 | 0 | 1 | 0 | 0 | 0 |

=

| CBV | 1 | 0 | 1 | 1 | 1 | 0 |

Fig. 10

AUTHENTICATED TRANSMISSION OF DATA

CROSS-REFERENCE AND PRIORITY CLAIM TO RELATED PATENT APPLICATION

This application is a §371 of PCT/EP2010/007439, filed on Nov. 30, 2010 and claims priority from Germany Patent Application No. 10 2009 055 947.7 filed on Nov. 30, 2009.

FIELD OF THE INVENTION

The invention relates to a method, a computer program, a configuration and a system for the transmission of data validated by at least one individual. The invention relates in particular to the field of transmission of data authenticated by the individual.

BRIEF BACKGROUND OF THE INVENTION

Especially in cost-relevant transactions, such as in online banking or in connection with online auctions, the following relevant information must be transmitted:
a) the receiver account that receives a credit (Receiver Account Number) or the purchase object for which a bid is being offered;
b) the amount that should be credited to the receiver or the amount of the bid (Ordered Amount);
c) the sender account to be debited (Sender Account Number, can be omitted in auctions);
d) the natural person who has initiated the transaction and who validated the transaction data.

In many data transmission protocols currently employed the information under a), b) and c) is inadequately protected. Information under d) is insufficiently secured in any of the known protocols.

A reliable transaction protocol must set up a fixed link from the initiator, e.g. individual (for example bank client) and the data to be transmitted. Through attacks, such as for example phishing, receiver account number and potentially also the amount are modified, e.g. falsified in the transactions initiated by bank clients. Through malware (software) on the computer of the individual, the amount and the destination account number can also be modified. Malware controlled from a distance, moreover, enables the attacker to be the initiator of a transaction and no longer the bank client himself.

Known is the so-called Homebanking Computer Interface (HBCI) developed by several German bank groups since 1996 and standardized by resolution of the Zentrale Kreditausschuss (ZKA). In the HBCI an interface is provided for a chip card-based online transaction protocol. The protocol was developed further by the ZKA into the Financial Transaction Services (FinTS). In HBCI/FinTS TAN (Trans Action Number) lists are omitted and, instead, a security-checked chip card reader and a chip card, also checked for security and in the possession of the bank client, are employed. Through the HBCI a tap-proof communication channel between the client computer and the bank server is established. The transaction data are signed with the private key of a key pair of the bank client. This key is securely stored in the chip card. The transaction data and the applied digital signature are transmitted to the bank server. However, malware on the client computer enables the transaction data to be changed before these are signed using the chip card.

In the TAN generator method mobile tokens are utilized which under time control can sequentially generate a TAN electronically. The TAN generator is supplied by mail to the bank client. Misuse is possible, especially if the generator falls into the hands of other individuals.

It has already been proposed to secure data transmissions against fraud or falsification by utilizing biometric methods. In classic biometric systems two phases are differentiated: the registration phase (enrollment) in which the future authentication is prepared with the aid of a biometric feature and the verification phase proper in which a biometric sample in digital form is taken.

However, in the authentication the problem is encountered of having to protect individuals against misuse of their biometric features. The private sphere of the individuals must be protected. The non-secured transmission of information regarding biometric characteristics must therefore be excluded. The encrypted transmission of such information is also not accepted by many individuals since, after the decryption at the receiver, biometric features are again available in recognizable form. Attempts at counteraction have been made thereby that biometric information is irreversibly modified by applying a one-way function (hash function) and stored only in this form at the receiver. Storage of biometric features at the receiver of the data, however, is complex and expensive and not desirable for reasons of data protection. The biometric features, moreover, must be in unchanged form before applying the one-way function. Since the typical user of methods of secured data transmission does not have precise knowledge of the procedural method, even the one-time use of unencrypted biometric feature information is not accepted by many individuals. In addition, the receiver of the data would have to ensure that he irreversibly deletes the unencrypted biometric feature information.

OBJECTS AND SUMMARY OF THE INVENTION

One of the problems addressed by the present invention is specifying a method, a computer program, a configuration and a system for the transmission of data which are validated by an individual or more than one individual. The certainty is to be increased that an individual validating the data transmission is the expected individual. In particular, the authentication of the data is to refer nonfalsifiably to the data to be transmitted and the private sphere of the individuals is to be protected.

A fundamental concept of the present invention states that secret information is generated or agreed which is provided to a data processing device that is later to transmit the authenticated data and, further, to at least one receiving device in unmodified or encoded form, wherein the receiving device subsequently is to receive the authenticated data. The secret information is linked by the data processing device with feature information (biometric reference) which is generated on the basis of at least one biometric characteristic of that individual who later is to validate the data transmission. The secret information linked with the feature information is stored as a reference datum in the data processing device. Before the linkage, the secret information is preferably processed for a future error correction in the preparation of the authenticated data transmission. For this purpose the secret information is subjected by the data processing device in particular to an encoding (ENC) of an ECC (Error Correcting Code) procedure.

For the linkage, in particular an XOR operation is performed of the partial information available as binary pattern, in particular bit strings (also referred to as binary vectors), to be linked. The XOR linkage ensures that without knowledge of the one partial information no conclusion of the, in each instance, other partial information can be drawn. However, conversely, with the knowledge of a partial information, conclusion regarding the other partial information is possible. This fact can be utilized for the extraction of the secret information from the reference datum.

An XOR operation or linkage links every bit of a first binary input vector with the corresponding bit (e.g. the bit at the same bit position) of a second binary vector. The binary vectors preferably have the same length, e.g. the same number of bits. However, it is also feasible to link in the linkage only those bits that have a corresponding bit in the other input vector, e.g. not to link the bits in the vector with the greater length that do not have a corresponding bit in the vector of shorter length. In the bitwise XOR operation the result is "1" if the linked bits are different. The result is "0" if the two bits to be linked are identical. The XOR operation has the advantage that through the repeated linkage of the result vector of the first XOR linkage with one of the input vectors, the, in each instance, other output vector is obtained. This applies to vectors of equal length. In the case of a vector of greater length, this applies accordingly to the shortened vector which with the shortened length has the same length as the other input vector. An embodiment example will be discussed in the description of the Figures.

The protocol or method introduced here realizes a data authentication and at the same time that of an individual. Therewith the individual authentication is inseparably linked to the data authentication. Falsification of the authentication is only possible if a non-authenticated characteristic is successfully presented to the capturing device for capturing the biometric characteristic of the individual. In all other cases the falsification is clearly detectable by the receiver of the data.

In particular, a transaction number, which can also be entered by a non-authorized individual, is not required. The reference datum comprises the biometric reference information linked with the secret information, which reference information had previously been determined from the biometric characteristic of the authorized individual. When the biometric characteristic of the authorized individual is captured and the biometric sample is generated therefrom, the biometric sample differs only minimally from the biometric reference information. An essential feature of the invention therefore comprises utilizing the biometric sample for the elimination of the biometric reference information from the reference datum and extracting only the potentially minimally changed secret information. In order to equalize the narrow differences of the secret information recovered in this manner from the original secret information, the extracted secret information is subjected to an error correction. If the biometric sample had been captured from the biometric characteristic of the authorized individual, then the correct secret information is again available for the authenticated data transmission. In all other cases the extracted and error-corrected secret information will not correspond to the original secret information. If such modified secret information is utilized for the authentication of the data transmission, the receiver will with certainty be able to detect this.

Thereby that the data to be transmitted and the corrected secret information are encoded utilizing a hash function and, with the use of a sealing function, are linked with one another, the secret information cannot be extracted from the linked and sealed data. This is ensured by the one-way properties of the hash function. The sealing function ensures further that the data to be transmitted and the corrected secret information are inseparably linked. It is consequently not possible to separate out the data to be transmitted and to replace them with other data to be transmitted.

A further concept of the present invention comprises implementing the data processing device and the input arrangement and linking or coupling them such that the software of the data processing device is not exposed to any manipulations. These features of the invention will subsequently be discussed in further detail:

The data processing device itself preferably comprises the means required for capturing of the at least one biometric characteristic, for example (robust against being overcome, especially with respect to artificial counterfeits), fingerprint scanner, vein scanner and/or iris scanner. The data processing device in this case comprises further at least one generation device for the generation of the feature information from the at least one captured biometric characteristic. This/these generation device(s) is/are connected with the linkage device, which links the feature information with the secret information.

If data to be authenticated are to be validated and transmitted, the data are preferably generated by a separate input device, for example a personal computer of the individual, and transmitted to the data processing device. This has the advantage that the data processing device can be free of application software which the individual or other individuals can install and uninstall.

The modification of the application software through malware possibly carried out without the knowledge of the individual has therewith also no effect on the data processing device. Rather, it is preferred that the data processing device has a fixed configuration which can only be set up and modified by authorized personnel (for example manufacturer or service technician). Conceivable is also a pure hardware implementation of the data processing device which preferably cannot be modified. It is therefore possible to provide for use a data processing device highly secure for use against manipulations.

It is further preferred for the data processing device to include a display device by which the data to be transmitted can be displayed. This has the advantage that the individual who is to validate the data, can recognize which data he validates and/or whether or not the data are correct. It can thereby be excluded that the data had been manipulated during the transfer to the data processing device.

If the data are to be authenticated, that individual who is to validate the data transmission, e.g. expected by the receiver as the sender of the data, presents at least one biometric characteristic to the data processing device. The representation of the presented characteristic is therewith available to a processing device. Thus, this at least one biometric characteristic, in turn, is utilized by the data processing device for generating a feature information (as a biometric sample), which, in the ideal case, is identical to the feature information (biometric reference) already described above. However, due to the differences in the capture of this same biometric characteristic (for example fingerprint), a difference can result in practice. The biometric sample generated directly for the preparation of the data transmission is now utilized to extract the secret information from the stored reference datum. For this purpose in particular the feature information (of the biometric sample) is linked with the reference datum with the goal of extracting the secret information. An XOR linkage of binary patterns, for example binary vectors (e.g. bit strings) can again be applied if the feature information (biometric sample) and the reference datum to be linked are in the appropriate form.

The recovered secret information is now encoded using a hash function. Hash functions are generally known in digital security technologies. The hash function should at least have the following properties:

It should have the so-called one-way property, e.g. it should be infeasible to determine the unencoded data from the data encoded with the aid of the hash function.

The hash function should be collision resistant, e.g. it should be infeasible to find two different unencoded data which in the coding using the hash function lead to identical encoded data.

Further, to the data in the data processing device to be validated the hash function is also applied before they are transmitted to the receiving device. This transmission of the data to be validated can mean a second transmission to the receiving device if the data had already been transmitted in advance from a separate input device on which they were generated (for example from a personal computer of the individual) to the receiving device in nonvalidated manner and not secured against manipulation (in the following this is referred to as a parallel path).

In principle, the data to be transmitted and the secret information can be linked using a sealing function before or after the application of the hash function. Preferred is the linkage after the application of the hash function since in this case the secret information encoded with the hash function can be available at the receiver and the data potentially already transmitted across a parallel path to the receiver can be encoded with the aid of the hash function and linked with the encoded secrete information in order to compare therewith the authenticated data received from the data processing device after a repeated application of the sealing function.

Application of the sealing function in the above described method has the following advantages:

The seal is applied when the (corrected) secrete information is available.

The secret information could, as described above, only be reconstructed with the aid of the biometric characteristic of that individual for whom the biometric reference had also been created.

The integrity and authenticity of the data to be validated can therefore be ensured. A preferred embodiment of the calculation of the seal is a MAC (Message Authentication Code) method based on hash functions.

By biometry is understood a measuring method for the recognition of individuals. The corresponding Standard ISO-SC37 of the International Standardization Committee defines the term "biometrics" as follows: "automated recognition of individuals based on their behavioural and biological characteristics". Accordingly, biometric methods analyze the behavior of human beings and/or a property of the biological characteristics. The biological characteristics can be classified, for one, as anatomical characteristics—marked by structures of the body—and, for another, as physiological characteristics—marked by functions of the body such as, for example, recognition of the voice. Each characteristic that can be reproducibly captured as a biometric sample, is suitable for the present invention.

Biometric authentication supplies in general a unique linkage of an individual with his identity, independently of the storage location of this identity. In known methods the procedure of biometric recognition can be divided into the following steps:

Capture of the biological characteristics using suitable sensors (for example camera, microphone, fingerprint scanner) and storage thereof as digital representation (for example image, voice recording).

Preprocessing for data improvement or data cleansing.

Feature extraction for the significant description of the patterns.

Comparison of the features of the biometric sample with the biometric reference.

The invention utilizes at least the first step and optionally also the second step, not, however, the third and fourth step. Rather, the biometric sample is utilized for the extraction of the available and stored secret information. Consequently, the private sphere of the individuals authenticating themselves is protected, since no direct representation of the characteristic is transmitted with the data. The invention is not limited to the use of specific biometric characteristics of individuals. On the other hand, every suitable capture method can be applied in connection with the present invention, for example face recognition, finger image or fingerprint recognition, vein pattern recognition and iris recognition. One factor determining suitability is derived from the capabilities of the capture method of detecting and rejecting an artificial counterfeit.

In particular a method is proposed for the transmission of data wherein the data are validated by at least one individual and wherein the method comprises the following steps:

the data to be transmitted are received and/or generated by an input arrangement, wherein the input arrangement is operatable by the individual, the data are transferred from the input arrangement to a data processing device for processing the data for authenticated data transmission, for the purpose of authentication by the individual, at least one biometric characteristic of the individual is captured by the data processing device in order to generate therefrom a feature information as a biometric sample, from the data processing device a reference datum stored therein is called up, wherein the reference datum includes biometric reference information that had been linked with secret information, wherein the biometric reference information is derived from at least one biometric characteristic of that individual who is to validate the authenticated data transmission, the data processing device links the biometric sample and the reference datum such that if there is agreement of the biometric reference information with the biometric sample, the secret information is extracted from the reference datum, the extracted secret information is subjected to error correction in order to correct discrepancies of biometric characteristics captured in different ways and discrepancies arisen therefore between biometric sample and biometric reference information, the data to be transmitted and the corrected secret information are encoded by the data processing device using a hash function and linked with one another using a sealing function such that authenticated data sealed according to the sealing function are formed, and the authenticated data are output for transmission.

The output authenticated data validated by the individual are in particular transmitted to a receiving device, wherein the receiving device has available secret information encoded with the hash function, the receiving device receiving the non-authenticated data across a parallel path, encoding the non-authenticated data using the hash function and linking them with the secret information, already encoded using the hash function, in order to obtain in this manner comparison data, and wherein the receiving device compares the comparison data with the received authenticated data and checks for agreement of the data.

With respect to the enrollment it is proposed that for the generation of the reference datum the secret information is subjected by the data processing device to an operation that corresponds to the reverse error correction according to the above defined method, wherein the data processing device generates a biometric reference based on at least one biometric characteristic of that individual who is later to validate the data transmissions, and links the biometric reference and the secret information subjected to the reverse error correction with one another such that the reference datum is formed and the reference datum is stored in a store of the data processing device.

Furthermore is proposed a configuration for the transmission of data which are validated by an individual, wherein the configuration comprises the following:

- a data processing device for processing the data for the transmission of authenticated data,
- an input arrangement connected with the data processing device, wherein the input arrangement is operatable by the individual in order to receive and/or generate the data to be transmitted,
- wherein the data processing device for the purpose of authentication by the individual comprises a capture device implemented for capturing at least one biometric characteristic of the individual in order to generate therefrom a feature information as a biometric sample,
- wherein the data processing device comprises a data store in which a reference datum is stored, the reference datum comprising a biometric reference information that had been linked with a secret information, wherein the biometric reference information had been derived from at least one biometric characteristic of the individual who is to validate the authenticated data transmission, and wherein the data processing device is implemented for calling up the reference datum from the data store,
- wherein the data processing device comprises a linkage device implemented for linking the biometric sample and the reference datum such that, if there is agreement of the biometric reference information with the biometric sample, the secret information is extracted from the reference datum,
- wherein the data processing device comprises an error correction device implemented for subjecting the extracted secret information to an error correction in order to correct discrepancies developed due to the biometric characteristics having been captured in different manner and discrepancies developed therefore between biometric sample and biometric reference information,
- wherein the data processing device is implemented for receiving the transmitted data from the input arrangement, to encode the data to be transmitted and the corrected secret information using a hash function and linking them using a sealing function such that authenticated data sealed according to the sealing function are formed and to output the authenticated data for transmission.

For the enrollment the data processing device is in particular implemented for subjecting the secret information to an operation for the generation of the reference datum, which operation corresponds to the reverse error correction according to the above described methodology, wherein the data processing device is implemented for generating, based on at least one biometric characteristic of that individual who later is to validate the data transmission, a biometric reference and to link the biometric reference and the secret information subjected to the reverse error correction with one another such that the reference datum is formed and the reference datum is stored in a store of the data processing device.

Within the scope of the invention is further a system comprising the configuration and a receiving device, wherein the receiving device is connected with the input arrangement and the data processing device, wherein the receiving device comprises a data store in which the secret information encoded with the hash function is stored, wherein the receiving device is implemented for receiving the non-authenticated data across a parallel path, to encode the non-authenticated data using the hash function and to link them with the secret information already encoded using the hash function in order to obtain comparison data in this manner and wherein the receiving device is implemented for comparing the comparison data with the received authenticated data and to check the data for agreement.

Also within the scope of the invention is a computer program implemented for executing the above listed method steps when the computer program is loaded in a working store of the data processing device. The computer program controls the data processing device in the following manner:

- for the purpose of authentication by the individual, at least one biometric characteristic of the individual is captured by the data processing device and therefrom a feature information is generated as a biometric sample,
- by the data processing device a reference datum stored therein is called up, wherein the reference datum comprises a biometric reference information which had been linked with a secret information, wherein the biometric reference information had been derived from at least one biometric characteristic of that individual who is to validate the authenticated data transmission,
- the data processing device links the biometric sample and the reference datum such that, if there is agreement of the biometric reference information with the biometric sample, the secret information is extracted from the reference datum,
- the extracted secret information is subjected to an error correction in order to correct the discrepancies, due to biometric characteristics captured in different manner, and the discrepancies formed therefore between the biometric sample and the biometric reference information,
- the data to be transmitted and the corrected secret information are encoded by the data processing device using a hash function and, using a sealing function, are linked with one another such that authenticated data sealed according to the sealing function are formed, and
- the authenticated data are output for transmission.

Alternatively to the computer program, the method steps of the present invention can be executed through appropriately implemented hardware, for example through application specific integrated circuitry (Application Specific Integrated Circuit—ASIC) or FPGA (Field Programmable Gate Array).

In an embodiment, related to the transmission of transaction data to banks, a secure Only Banking Server (OBS) is provided comprising the following properties. In different applications of the data transmission according to the invention (for example online auction) an appropriate server with the same properties can be utilized: the OBS has access to client data, establishes communication with the Online Banking Software (BSW), running on the non-secure computer of the client, and completes transactions. The OBS is capable of detecting an additional secure data processing device at the client as a communication partner and of setting up a connection (in particular a VPN, Virtual Private Network connection) therewith. The data processing device can be referred to as Biometric Transaction Device (BTD) since it can capture biometric characteristics of individuals and prepare transactions (e.g. data transmissions). To capture the geometric [sic] characteristics, it comprises a capture device which can be referred to as Biometric Capture Device (BCD) or sensor. The capture device is preferably certified as against manipulations of the capture of biometric characteristics and thus suitable in particular for use for not professionally monitored application in home or office.

When in this description the terms 'secure' and 'non-secure' devices are utilized, this indicates first that the secure device is more secure against manipulations than the non-secure device. The secure device is preferably tested and certified according to a specified security standard. The secure device is to be protected n particular against malware.

The BTD comprises secure hardware similar to a card reader or a secoder according to ZKA requirements. Alternatively, it can be an expansion of the USB sticks which are already available for protected data transmission. A further alternative is a secure mobile telephone. The BTD can recognize an OBS as a communication partner and can set up a secure (for example VPN) connection with the OBS. It can further receive a transaction order (TRO, an order for executing a data transmission) from the BSW and display it such (for example on a video screen and/or acoustically) that the user can recognize the data to be transmitted. Displayed are at least the essential transaction data which are preferably combined in the form of a Transaction Order Record (TOR). Apart from the data proper to be transmitted, the TOR comprises a transaction identifier (TID).

The BSW is run on the non-secure client computer which can thus be compromised for example through Trojan horses and so-called Root Kits. The BSW can be software installed on the cheat computer or be a browser-based application. It communicates with the OBS and transfers orders in the form of a Transaction Order Record (TOR). A TOR includes a transaction identifier (TID), a Sender Account Number (SAN, account number of the client), a Receiver Account Number (RAN, account number of the receiver of the bank transfer), the Ordered Amount (ORA, the amount of money that is to be transferred). The client computer with the BSW is connected with the BTD.

Communication between BSW and BTD can be realized in different ways. For example, it can be realized wirelessly or by means of cable, possibly wirelessly under the Bluetooth protocol or utilizing a USB (Universal Serial Bus). Data transmission across an optical interface such as described in HDD 1.3.2 is also feasible. For example, when using a mobile telephone as the BTD, a photo interface of the BTD can be utilized, wherein the camera of the BTD is employed thereby that it acquires an image representation of the TOR.

In a further development of the method, utilizing the secret information and/or utilizing at least a portion of the data to be transmitted, a transaction number is generated by the data processing device and the transaction number is output for the purpose of securing a transmission of the authenticated data. It is herein preferred that to the portion of the data to be transmitted and/or to the secret information, first, the hash function is applied and the data modified thus to be transmitted are utilized for the generation of a transaction number. In particular, if the secret information is utilized which had been extracted from the reference datum, through the transaction number dependent thereon an especially high security of the data transmission is attained. The receiving device can also retrace the calculation of the transaction number using the transmitted data and/or the secret information and thus check the authenticity of the transaction in conjunction with the transaction number.

Embodiment examples of the invention will be described with reference to the enclosed drawing.

DETAILED DESCRIPTION

Figure 1:
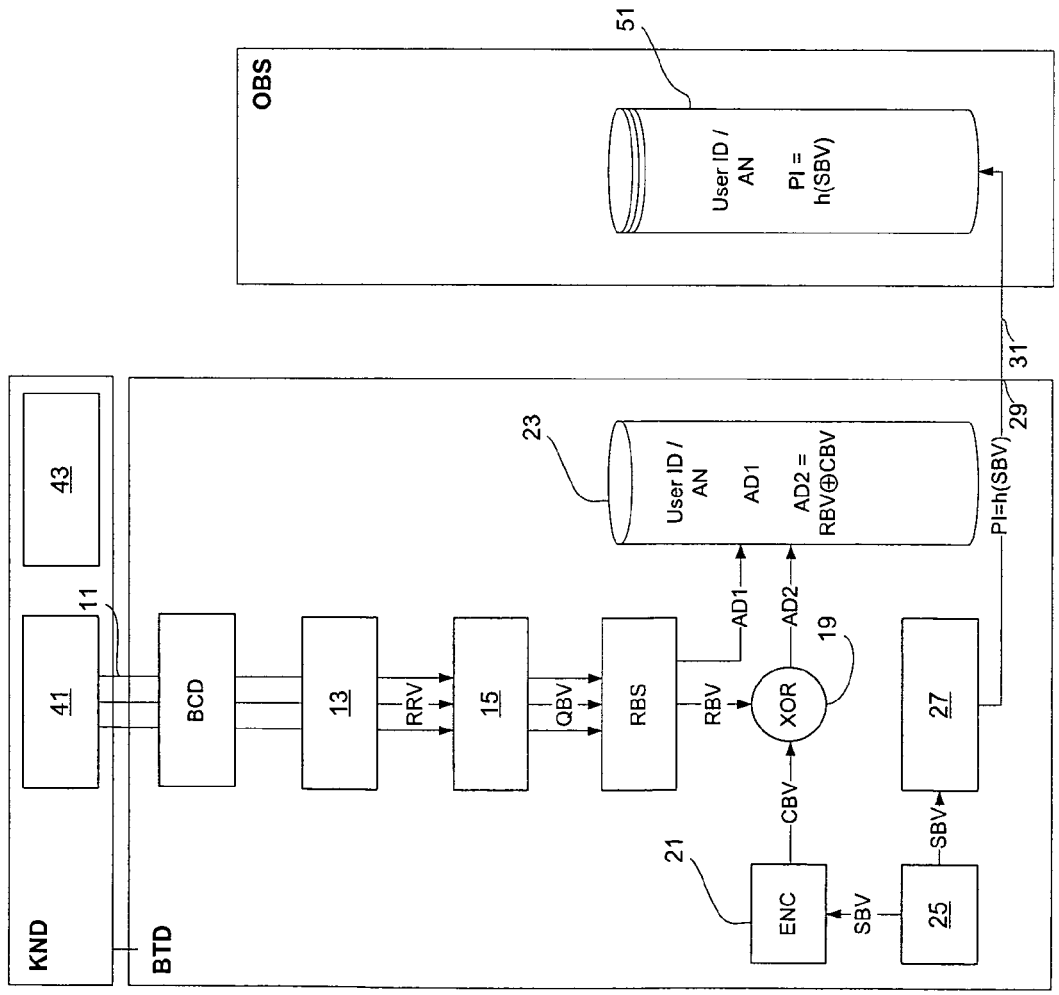
FIG. 1. schematically a configuration with a data processing device, the user of the device and a receiving device which is to receive subsequently data authenticated and validated by the user, wherein in conjunction with FIG. 1 the enrollment is described, FIG. 2 the configuration according to FIG. 1, wherein, however, in addition the software is depicted implemented on a non-secure input arrangement (for example personal computer) of the user, FIG. 3 an alternative to the configuration depicted in FIG. 2, FIG. 4 an example of a linkage of a first and a second binary vector with an XOR linkage, FIG. 5 an example of a second linkage of two binary vectors with an XOR operation, and FIG. 6-10 an example of the execution of an error correction method.

FIG. 1 shows a data processing device BTD preferably certified as a secure device. The data processing device BTD comprises an interface 11 across which the at least one biometric characteristic is captured and thus feature information can reach the data processing device. The data processing device BTD comprises, for example, a corresponding sensor or several such sensors for capturing at least one biometric characteristic of an individual. The sensor(s) is/are denoted by the reference symbol BCD. With the sensor(s) BCD is connected a device 15 for the binarization of the feature information. This binarization device 15, in turn, is connected with an optionally provided selection device RBS which serves for the enhancement of the biometric recognition capacity. The optionally provided selection device analyzes the biometric feature information, which is available, for example, in the form of a binary vector, for suitable components and/or selects such suitable components. An example will be discussed.

An output of the selection device or of the device 15 is connected with a linkage device 19, which, in turn, includes two further inputs and outputs, namely to an error correction device 21 and to a data store 23 of the data processing device BTD. The error correction device 21 is connected with a device 25 for providing the secret information. The device 25 is, in addition, connected with a data processing device 27 for the application of a hash function.

The data processing device BTD includes further an output 29 for the output and transmission of data to a remote receiving device, in this embodiment example the receiving device OBS. The data transmission is carried out wirelessly and/or across a cable connection 31. The transmitting and receiving devices required for the execution of the data transmission proper between the data processing device BTD and the receiving device OBS are not further depicted in the Figures. These devices can, in principle, be implemented as known and are therefore not described here in greater detail.

Figure 2:
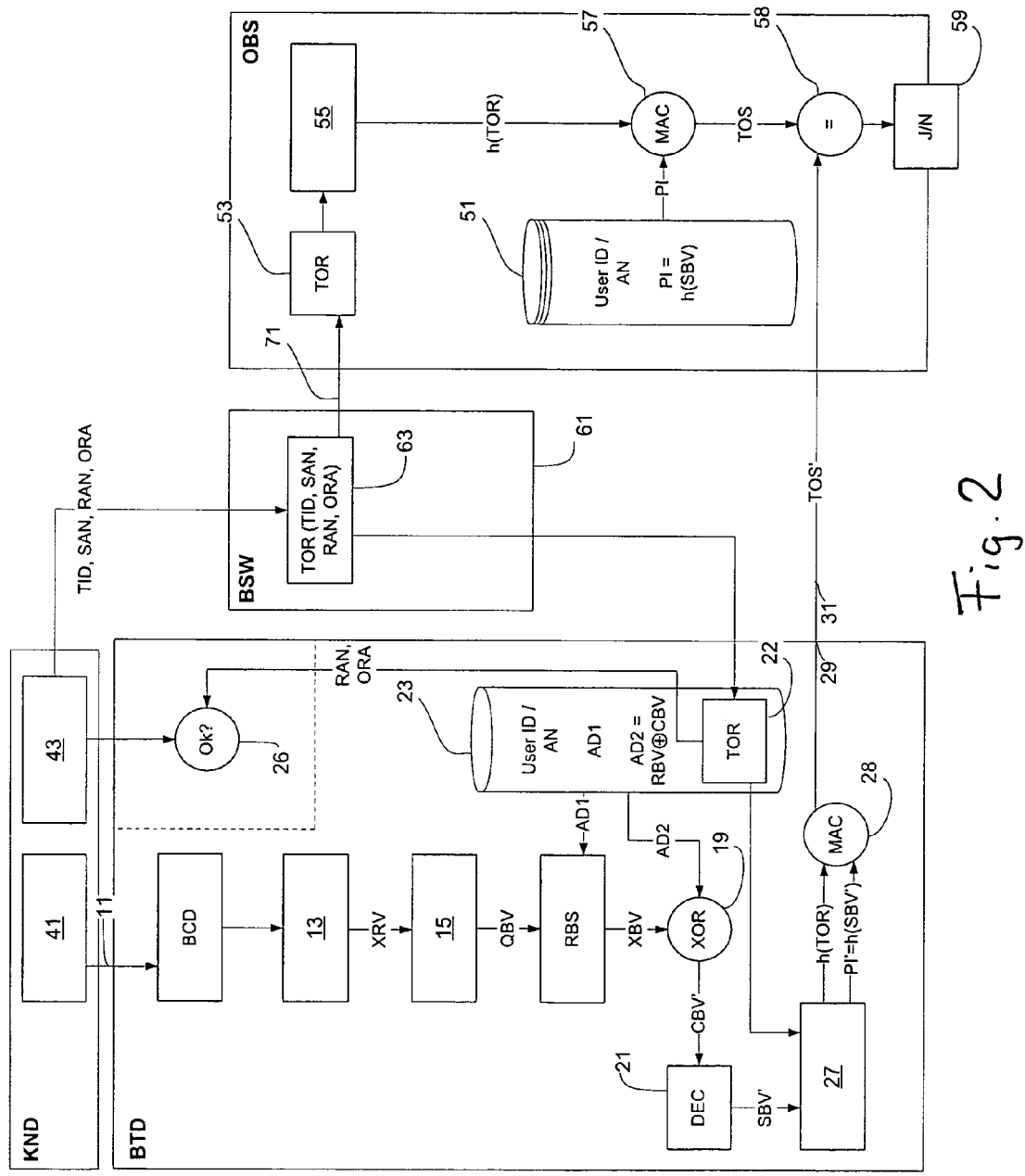

Like FIG. 2, FIG. 1 shows, in addition, schematically a user KND. The user KND has at least one biometric characteristic 41. The user KND is further capable of entering information into an apparatus, not shown in FIG. 1. The information entered is represented in FIG. 1 and FIG. 2 in the form of a rectangle denoted by the reference symbol 43.

The receiving device OBS comprises a data store 51. Further optionally provided devices of the data processing device BTD and the receiving device OBS are not depicted in FIG. 1. The devices BTD, OBS can further comprise not only optionally provided additional devices which will be discussed in further detail in conjunction with FIG. 2 and FIG. 3.

If in this description devices of the receiving device and of the transmitting device are discussed, these may involve devices realized through hardware and/or software. In particular in the realization through software, at least parts of the devices can be common parts which can also be utilized by other devices. For example, a software routine can be utilized by the error correction device 21 as well as also by the device 27 for the application of a hash function. The data processing device BTD can therefore be a device which comprises hardware elements (for example ASIC—Application Specific Integrated Circuit) implemented especially for the purpose described here. However, it can also involve a device conventional from the aspect of fundamental hardware structure, for example similar to a personal computer which comprises at least a working store and at least one data processor connected with one another across a data bus. In this case the operation of the device is software controlled. A corresponding computer program is therefore within the scope of the invention.

The receiving device OBS is typically a server, for example a bank server for processing client transactions.

In the following the functional operation of the configuration depicted in FIG. 1 is described for the purpose of enrollment. In the embodiment example a Biometric Transaction Device BTD is preferably employed as the data processing device which is certified as having been tested for security.

First, by the BTD at least one biometric representation of at least one biometric characteristic is generated. It is preferable for several biometric representations being generated of the same characteristic and from these representations feature information is calculated. This has the advantage that a mean value of the feature information can be obtained and/or possible discrepancies can be determined in the capture of the same characteristic. Thereby in particular the necessary tolerance range for the error correction method can be reduced. In principle, the generation of the biometric representation of a biometric characteristic can be carried out as is known per se within prior art. The capture proper of the characteristic and generation of corresponding feature information is carried out by the capture device BCD, for example a camera. The corresponding sensor interface 11, for example the camera objective, is depicted at the top in FIG. 1.

The output signal of the capture device BCD is transmitted to the feature extraction device 13. The output signal of device 13 is denoted in FIG. 1 by RRV. The feature vector RRV is transmitted to the binarization device 15.

The binarization device 15 generates from the output signal of the feature extraction device 13 binarized data, preferably a binarized feature vector QBV. The optional processing unit RBS selects from QBV the relevant information. The feature extraction device or the optional RBS processing unit can, additionally, output auxiliary AD1 to the data store 23. The auxiliary data involve data which, with respect to the private sphere of the user KND, are not especially worthy of protection. These auxiliary data AD1 will still be described in further detail in conjunction with a special embodiment example. If the optional selection device RBS is provided, the feature information binarized by the binarization device 15 is output to the selection device RBS which selects therefrom the biometric reference information RBV. The biometric reference information RBV is linked with a secret information CBV, processed for subsequent error correction, by the linkage device 19, in particular in an XOR operation such that second auxiliary data AD2 (as reference datum) are generated which are saved in the data store 23 for later use. If the selection device RBS is not provided, the output signal of the binarization device 15 is directly supplied to the linkage device 19 as biometric reference information.

Further variants of the configuration depicted in FIG. 1 can, in principle, occur which are also capable of executing the fundamental principle of the present invention. In particular, the combination depicted in FIG. 1 of the device BCD, 13, 15, RBS can be implemented differently. Among the basic components of the data processing device are in general only a device for constructing the biometric reference information during the enrollment and also later the biometric sample during the verification, a linkage device, a device for providing the secret information, wherein the linkage device links the provided secret information and the biometric reference information to form the reference datum and saves them in the data store.

In the embodiment example specifically depicted in FIG. 1 the secret information is provided by the device 25. This device can be, for example, a random number generator. Alternatively, a chip card reader can be provided into which is inserted a chip card of the user and on which the secret information is stored. The chip card reader reads the secret information from the chip card and provides it thus to the data processing device. There are further feasibilities for providing the secret information. For example, a so-called token (key) can be utilized, such as is known to be already employed in other transaction methods. It is further feasible for the secret information to be provided by the receiving device, for example the device OBS, and transmitted to the data processing device, for example via postal mail. In the depiction of FIG. 1 it is introduced into the process path at the site of device 25.

As a result, at the output of the device 25 the secret information is available, which is denoted by the abbreviation SBV.

This secret information SBV is supplied to the error correction device 21 for preparation of he error correction to be performed later. The error correction device 21 in particular carries out an encoding (ENC) of the error correcting Code (ECC) method. The result of this reverse error correction, the secret information CBV prepared for the linkage with the biometric sample is available.

In the embodiment example of FIG. 1 the secret information is generated in the data processing device or is here introduced directly for the first time. In this case, the secret information SBV is supplied from the device 25 to a device 27 for application of a hash function. After carrying out the hash function, e.g. after the secret information had been irreversibly modified, this modified secret information PI is supplied to the receiver. In the embodiment example this takes place across output 29 and the data transmission connection 31. The modified secret information PI is stored in the data store 51 of the receiving device OBS.

In the following especially preferred embodiment examples for the operation of the data processing device BTD, or for parts thereof, will be described.

The feature information described previously in the embodiment example is denoted as biometric reference information during the enrollment, during the authentication process (also referred to as verification), however, it is referred to as biometric sample. The auxiliary data AD2, which had been generated through the linkage of the biometric reference information with the prepared secret information CBV, were denoted before the description of the Figures as reference datum.

The enrollment serves in particular for the purpose of registering the user before the system can be utilized. To this end the user presents, preferably multiple times, a biometric characteristic (for example the vein image of the right middle finger). Therefrom the capture device BCD extracts sorted feature vectors of identical length. There are now two processes running simultaneously.

The first process executed by the binarization device 15 generates a binary representation of the biometric data. For this purpose statistic data regarding feature vectors of the characteristic (for example vein images of the right middle finger of a population, e.g. not or not only that of the user, but a multiplicity of individuals) are utilized in order to carry out quantization of the input feature vectors.

The quantized binary vectors generated thus are analyzed by the selection device RBS. Again, the statistical data are utilized, this time to identify positions in the vectors at which there are bits which, on the one hand, differ from the mean of all vectors of the population, however, also occur stably, and thus reproducibly, in the input features. The positions are transferred as first auxiliary data AD1 to the data store 23. The binary vector, which contains the most stable components of all generated binary vectors, is supplied to the linkage device 19 as biometric sample RBV.

In the second process the device 25 generates a binary secret vector SBV. The hash value h(SBV) of this vector is stored in the data store. Based on the one-way property of the hash function, calculation of the secret vector SBV from the hash value h(SBV) is not possible. This hash value can be considered to be the pseudo-identity PI of the user, meaning the hash value represents a unique pseudo-identity (PI) of the user not, however, a biometric characteristic.

The secret vector SBV is now linked as follows with the binary vector from the first process, the biometric reference information RBV: an encoding (ENC) of the error correction method (ECC) is utilized for the generation from the secret vector SBV a vector CBV resistant against single bit errors. Single bit errors can occur in the biometric sample and can be caused by the variation in the biometric characteristic or by changes of environmental influences (temperature, humidity) during the capture of the biometric characteristic. The capability of the error correction method can be easily varied. The more errors are to be corrected, the smaller is the fraction of the secret vector SBV in the secret information CBV at the output of the error correction device 21. In the preferred embodiment example the error correction code is selected such that the secret vector CBV and the binary vector RBV (the biometric sample) have identical lengths. An XOR operation for linking these two vectors ensures that without knowledge of one of the two entries no conclusion can be drawn regarding the other entry. This resulting vector AD2 (the reference datum) can be saved as reference without special protection against being read out (for example encryption) in the data base since the correct biometric sample is required for the extraction of the secret information.

The embodiment depicted in the Figures represent a special case of the invention since biometric features of only one individual are captured during the enrollment as well as also during the later verification. However, it is possible that two or more individuals are to authenticate a data transaction. In this case the enrollment is carried out with each individual individually and this is specifically done sequentially using the same data processing device which captures the biometric characteristics for each individual and generates a reference datum for each individual. Alternatively, the biometric samples of the individual individuals are only linked with a single secret information jointly to form a single reference datum. In this case the associated pseudo-identity is an identity of the group of individuals. Therefore, independently of whether one or several reference data are available, in the verification (in all cases) all individuals must again be available for the generation of a biometric sample.

During the enrollment as well as also during the later verification, and specifically in the data processing device BTD as well as also in the receiver OBS, as the hash function can be employed, for example, the hash function RIPEMD-160 (RACE Integrity Primitives Evaluation Message Digest). This hash function is a cryptographic hash function with an output of 160 bits. However, other hash functions can also be employed. If comparison values are to be generated by different devices (in particular the data processing device and the receiving device) each using hash functions or if values are to be reproducible, e.g. modified repeatedly with the same hash function, it must be ensured that the same hash function is always employed. Such is the case in the present invention. Therefore in the data processing device and in the receiving device or receiving devices, at least with respect to the processing of data transactions of a specific individual or a specific group of individuals, the same hash function is always used.

In the following a first variant of the invention will be described in conjunction with FIG. 2. In the Figure a receiving device OBS, in particular the receiving device OBS from FIG. 1, as well as a data processing device BTD, in particular the data processing device BTD from FIG. 1, is also depicted. In both devices, BTD and OBS, however, additional devices are depicted. Further the same devices as well as connections between these devices as in FIG. 1, are depicted. Those elements that have already been explained will not be discussed again unless it relates to the function of the device for the verification.

Additional elements of the data processing device BTD are a data store location 22 for storing the data TOR (Transaction Order Record) to be transmitted through the transaction, a connection of this storage location to the device 27 for the application of a hash function, a linkage device 28 for the linkage and sealing of the secret information and the data to be transmitted as well as a device 26 for the display and validation by the user KND of the data to be transmitted.

In the receiving device OBS the following additional elements are depicted: a device 53 for receiving the data TOR, a device 55 connected thereto for the application of the hash function, a linkage and sealing device 57 connected, in turn, thereto, which is additionally connected to the data store 51, a comparison device 58 connected with an output of the device 57, and an output device 59 which outputs the result of the comparison of the comparison device 58. The comparison device 58 is herein connected to the output 29 of the data processing device BTD across a data transmission connection 31. This output 29, in turn, is connected to an output of the linkage-sealing device 28. If the transaction is carried out in the receiving device itself, the external output can be omitted. In this case, for example, a transaction device of the receiving device receives the signal of the comparison device 58.

In the configuration according to FIG. 2 is further depicted a user device BSW, for example, a personal computer, which is denoted by the reference symbol 61. This user device serves for generating the data to be transmitted and does not need to be tested for security and certified.

In a variant of the present invention this user device can be omitted. In this case the data processing device BTD itself must comprise an input arrangement for entering the data to be transmitted. In this case it must be ensured that the input device must also be secure against manipulation and in particular that no malware can reach the data processing device BTD. For this reason this variant is not preferred. In the case of the variant depicted in FIG. 2 malware can be installed on the user device 61. As long as the data to be transmitted, after they have reached the data processing device BTD, are again validated by the user KND, the malware cannot effect any manipulation or such manipulations are revealed by the receiving device as will be described later in greater detail.

In the following the functional operation of the configuration depicted in FIG. 2 will be described. From the enrollment in the data store 23 of the data processing device BTD the reference datum AD2 and the auxiliary data AD1 are stored. The user now carries out two actions sequentially or simultaneously. For one, he enters the data to be transmitted with the aid of the user device 61. These data TOR are transmitted by the user device 61 from the input device 63 to the storage location 22 of the data processing device BTD. This storage location 22 can be a range of the data store 23 or a separate data store. The essential elements of the TOR, in particular the Receiver Account Number (RAN) and the Ordered Amount (ORA) are subsequently displayed on the secure BTD or, alternatively, are output (for example acoustically or in printed form). Subsequently, during and/or after testing the output elements of the TOR, the user KND again generates at least one biometric representation, e.g. the user KND presents the same biometric characteristic or the same biometric characteristics as in the enrollment. The at least one characteristic is captured at least once across the sensor interface 11 by the capture device BCD and, as in the enrollment, is binarized through the binarization device 15. Also as in the enrollment, a selection is optionally carried out by the selection device RBS. Herein the selection device RBS accesses a first auxiliary data AD1 stored in the data store 23. As a result, to the linkage device 19 is again supplied a biometric sample XBV which is largely identical to the biometric reference information during the enrollment if the same biometric characteristic or the same biometric characteristics as in the enrollment are involved. Further the reference datum AD2 from store 23 is supplied to the linkage device 19. In the case there is agreement or extensive agreement of biometric sample XBV and biometric reference information RBV from the enrollment and in the verification carried out here, this [linkage device] extracts the secret information CBV' which is supplied to the error correction device 21. This corrects potential discrepancies between the extracted secret information CBV' and the original prepared secret information CBV. The correction is only successful if the biometric reference information RBV and the biometric sample XBV from enrollment and verification agree or at least extensively agree, e.g. the same individual has presented the same biometric characteristics or the same biometric characteristic. Therefore at the output of the correction device 21 in FIG. 2 the signal is denoted by SBV'. It can, in principle, differ from the signal SBV of the original secret information from the enrollment. If there is agreement of the biometric samples, the secret information SBV' from the verification, however, is identical to the original secret information SBV.

By the device 27 a hash function is applied to the secret information SBV', in particular the same hash function as in the enrollment according to FIG. 1.

After the data TOR to be transmitted had been transmitted to the storage location 22, these are reproduced by the device 26 such that the user KND can check the data. The user can validate the data through an entry. In the absence of an entry or if the user enters that the data are not correct, the data are not further processed and no validation is transmitted to the receiver. However, if the user KND validates the data, they are transferred from the storage location 22 also to the device 27 for the application of a hash function. In the embodiment example the device 27 applies the hash function separately to the secret information SBV' and to the data TOR to be transmitted and outputs the resulting modified data to the linkage device 28. This [device] links the data, namely the data h(TOR), modified through the hash function and to be transmitted, and the pseudo-identity PI of the user and seals these linked data. As a result the linkage device 28 outputs the sealed data TOS' which are transmitted across the output 29 of the data processing device BTD and across the transmission connection 31 to the comparison device 58 of the receiving device OBS.

In addition, across a separate data transmission connection 71 between the user device 61 and the data receiving device 53, the data TOR to be transmitted are transmitted. The receiving device OBS now retraces the operations which the data processing device BTD had applied to the data to be transmitted. First, in device 55 the hash function is applied to the received data. The resulting hash value h(TOR) is transmitted to the linkage device 57 which, in addition, calls up from the data store 51 the pseudo-identity PI. After the linkage and application of the sealing function in the same manner as in the operation of the linkage device 28, sealed data TOS are generated and output to the comparison device 58. If the sealed data TOS generated within the receiving device and the sealed data TOS' received across the transmission connection 31 from the device BTD agree, this is detected by the comparison device and output or displayed by the device 59. Otherwise the device 59 indicates that the data do not agree. In this case the receiving device OBS does not acknowledge the transaction. In contrast, if there is agreement, the transaction is successful and is accepted by the receiving device OBS.

The linkage device 28 and also the linkage device 57 which are to be operated in the same manner, can execute for example an HMAC method (Hash Message Authentication Code). The HMAC code is calculated from the message proper, here the data TOR to be transmitted, and from a secret key, here the secret information SBV' or SBV. For the implementation of the sealing function, the linkage device, like the separate device 27, falls back on the calculation of hash values, which, however, is not depicted in detail in FIG. 2. The sealed data can be calculated through a sealing datum TOS' to be transmitted as follows:

$$TOS'=h(PI\ XOR\ OPAD\ o\ h(PI\ XOR\ IPAD\ o\ TOR))$$

Herein OPAD and IPAD are static initialization vectors defined by the HMAC method. Since the HMAC method is known in principle, not, however, with respect to the present invention, it will not be discussed in greater detail here. Further signifies h( . . . ) the application of the hash function to the bracketed content. Operation XOR has already been explained. It stands for the bitwise XOR operation of binary vectors. "Cursive o" signifies the linkage through simple assemblage, e.g. through concatenation of the individual data. In principle—not only in the embodiment example described here—it is also feasible to have the operations (formation of hash values and sealing), executed in the embodiment example by the device 27 and by the linkage device 28 according to a calculation, performed by a single device similar to the above equation.

It has been stated above that the data TOR to be transmitted are transferred directly from the user device 61 across a different data transmission connection 71 than the sealed data TOS'. However, in practice these separate data connections can also be realized thereby that, for example, the data transmission connection 31 is "tunneled" across the data transmission connection 71. In this case the sealed data TOS' are additionally encrypted, however, transmitted using the same transmission protocol and the same physical connection as the data TOR. The tunnel is set up between the data processing device and the receiving device OBS (not depicted in FIG. 2). It is further feasible that, while the same physical data transmission connection is utilized for both data, TOR and TOS', separate channels are, however, employed. In practice a VPN connection is preferably utilized for the sealed data TOS', for example, for this purpose a radio connection from the data processing device BTD across the public mobile radio network to the receiving device OBS can be utilized. In contrast, the user computer 61 can be connected, for example via the Internet with the receiving device OBS.

Figure 3:
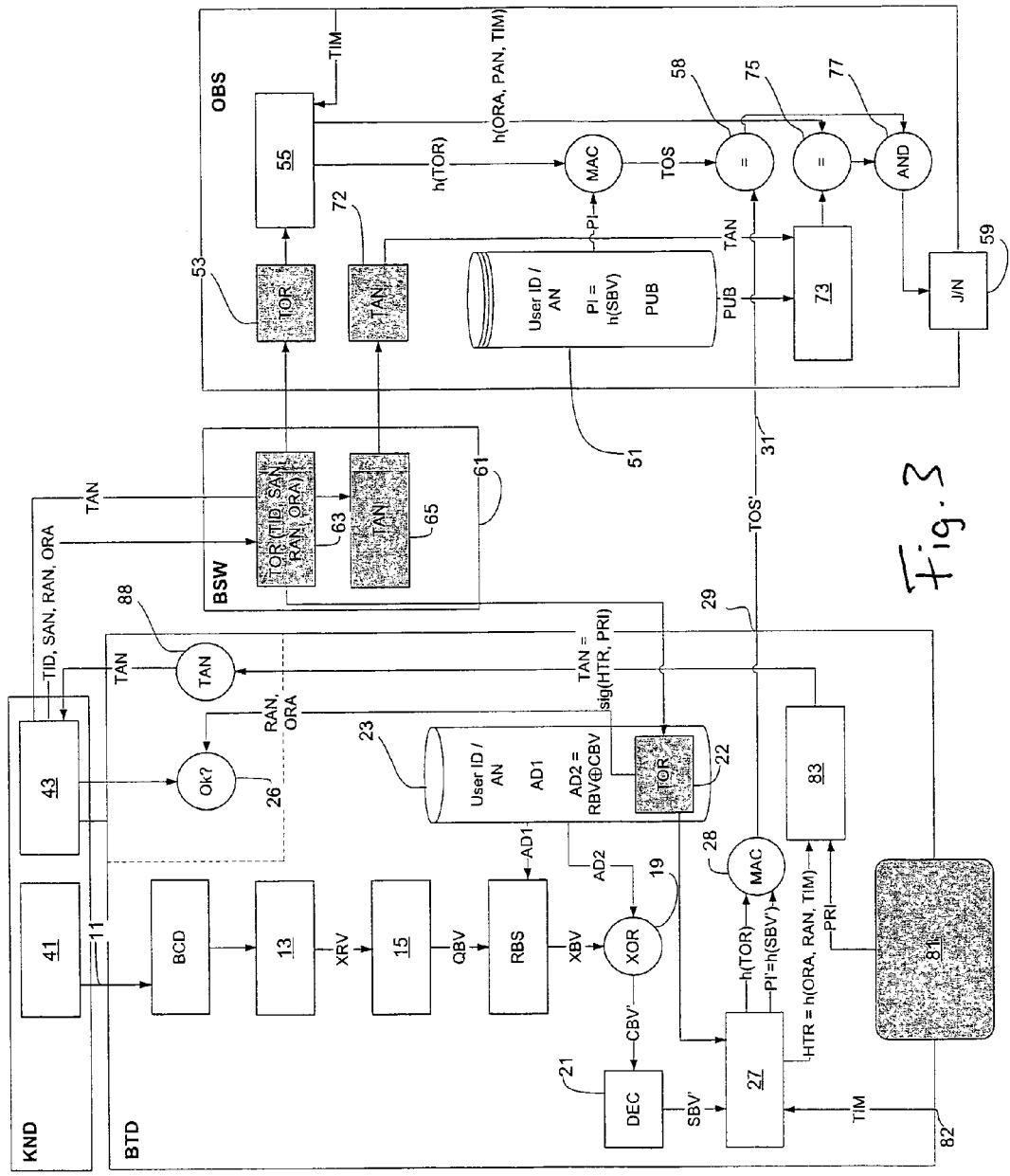

With reference to FIG. 3 now a variant will be described of the verification method for carrying out a transaction explained in conjunction with FIG. 2. The configuration depicted in FIG. 3, again, comprises the data processing device BTD, the user device 61 and the receiving device OBS. These three devices, however, comprise additional elements and additional internal connection and linkages. This involves an expansion of the verification method explained in conjunction with FIG. 2, in which also a transaction number TAN is employed. The TAN can be generated in different ways, in particular in every manner known per se, for example mTAN, sm@rt-TAN, eTAN, chip TAN manual or chipTAN comfort. It is preferred that using the current time of day, a chip card of the user, the secret information and, using at least portions of the data to be transmitted (for example receiver account number and/or sum of money to be transferred in the bank transaction), in the receiving device a transaction number is calculated which is displayed by the data processing device BTD to the user KND and entered by the user into the user device 61. Alternatively, the TAN generated by the data processing device BTD can be automatically transmitted across an interface to the user device 61, for example, across an optical interface.

The additional elements in the device BTD are the following: a card reader, a device 83 connected to the card reader 81 as well as to the device for the application of a hash function 27, a TAN display arrangement 88 which displays to the user KND the TAN determined by the device 83. The special implementation depicted here comprises further an input 82 for a time window identifier TIM. This input is connected with the device 27 for the application of the hash function. Such a time window identifier, however, can also be omitted. In the embodiment example the device 27 calculates from the TIM and from the secret information received by device 21, as well as at least from a portion of the data TOR to be transmitted, a transaction hash value HTR, wherein the following values in the preferred embodiment are concatenated: the amount of money directed to be transferred (in the case of a bank transaction, otherwise a corresponding assigned value of the data transmission), the account number of the receiver (or in the case of another transaction a second assigned number) as well as the time window identifier TIM. With the time window identifier, which must also be known to the receiving device OBS, the transaction number TAN is generated as a function of the current point in time or of a time window in which the current point in time is located, for example, if the transaction takes up too much time, the receiving device can already have another current time window such that the transaction number is no longer accepted. The repetition of transactions already completed (as a rule with changed data) through a so-called replay attack is made difficult using the time window identifier. However, the time window identifier is not an absolute precondition for the formation of a TAN for use with the method introduced here.

The transaction hash value HTR in the special embodiment example is now digitally signed with the value read by the chip card reader, which is stored on the inserted or connected chip card. This digitally signed transaction hash value can be utilized as the transaction number. The transaction number is displayed to the user KND on the display arrangement 88. The user KND thereupon enters the displayed transaction number into his user device BSW.

Again, as also described in connection with the communication in FIG. 2, between the user device BSW and the data processing device BTD for the transfer of the data TOR to be transmitted, other paths for the transmission of the TAN from the data processing device to the user device can also be selected. For example optical transmission via a display of the data processing device and an appropriate camera of the user device can be realized.

Apart from the data TOR proper to be transmitted, this device 61 also transmits the transaction number to the receiving device. The transaction number is here received by the receiving device 72 and prepared for comparison. To check the transaction number, to the receiving device OBS is also available the time window identifier TIM and specifically to the device 55 for the calculation of a hash value from the received data TOR. The device 55 applies the hash function in the same manner as the device 27 of the data processing device BTD to the time window identifier as well as portions of the received data, in the embodiment example the amount directed for transfer and the account number of the receiver, and outputs the corresponding hash value to the comparison device 75. In store 51 is also stored the public key associated with the signature of the chip card, which had been transmitted by the chip card reader 81 to the device 83. This [public key] is supplied to a device 73 to which, in addition, the TAN is supplied by the receiving device 72. With the aid of the public key, the device 73 checks the signature of the client. The device 73, moreover, checks also optionally whether the chip card inserted by the client into the card reader 81 is valid, in particular if it has been entered into a list of cancelled cards. The device 73 further identifies the transaction number and supplies it to the second comparison device 75. This [device] carries out the comparison between the hash value received by the device and the transaction number. If there is agreement, it outputs a validation signal which confirms that the transaction is valid at least with respect to the transaction number. Otherwise it outputs a signal indicating the invalidity of the transaction. The particular signal is output to the linkage device 77 which, in addition, receives the result signal of the comparison of the comparison device 58. The comparison device 58, as well as other parts of the receiving device OBS, performs the functions described in conjunction with FIG. 2. The linkage device 77 links the output signals of the comparison devices 58, 75 using an "AND" operation. Only in the event that both signals confirm the validity of the transaction, does the linkage device 57 output a validity signal as confirmation of the validity of the transaction. Otherwise it outputs a signal confirming the invalidity of the transaction. The result is displayed or output by the display or output device 59.

The functional operation of the generation and the verification of the transaction number was only described based on one embodiment example. In principle, not only in reference to this special implementation, the use of the transaction number is based on the underlying concept that the transaction number is generated using at least a portion of the data TOR to be transmitted and/or using the secret information. Herein preferably a hash function is applied to this information such that the resulting hash value, due to the one-way property, cannot be calculated back to the input data of the hash function. The receiving device can also execute the same operations and consequently check the validity of the transaction number. Since the operational function of the data processing device of the receiving device is coordinated thereby that a signature key pair is utilized, the transaction number is secured in a special manner. In particular, a physical token (for example Maestro Card of the user) can be employed for generating the TAN, which is only available to the individual and not to an attacker. In this case, without the correct key on the token, the correct transaction number cannot be generated. Thus, only the owner of the card can generate the correct transaction number which, in addition to the biometric sample, is to validate and authenticate the data to be transmitted.

If during the enrollment not only one individual has presented a biometric characteristic and therefrom a biometric sample was obtained which, in turn, was linked with the secret information and was stored, in the verification the corresponding group of at least two individuals must present the particular characteristic and therefrom biometric samples must be obtained. Otherwise, the correct secret information cannot be reconstructed. As soon as the correct secret information is reconstructed, the method of the validated and authenticated data transmission can be executed in the same manner as in the case of one individual.

Further, the transaction can be transmitted not only to one receiving device but also to several receiving devices. It is here also conceivable that the data to be transmitted are transmitted to a first receiving device and the transaction data sealed and subjected to a hash function are supplied to a second receiving device. The two receiving devices can subsequently establish connection with one another in order to carry out the described verification. It is also conceivable that several authorized individuals, independently of one another and at different locations, have each access to a data processing device and carry out a validation of the same transaction data. The transaction data are either distributed to the data processing devices or coordinated between these, or each user generates the data himself at his own data processing device. However, the receiving device carries out the transaction only if the sealed and authenticated data from all participating individuals have arrived in the receiving device.

If in the general part of the description the term 'data' is used, which are validated by an individual, this also includes the case that the individual carries out the corresponding entries directly at the secure data processing device. Through the input by the authorized individual the data are also validated. For example it can be necessary that the biometric characteristic of this authorized individual is continuously presented to the data processing device and this [device] repeatedly prepares biometric samples for checking while the individual enters the data.

In the general part of the description and in the description of the Figures reference was repeatedly made to the application example of the transmission of a bank transaction, e.g. of a money transfer. However, the invention is also suitable for other data transactions, which require secure, validated and authenticated data transmission. For example this is the case in online auctions.

Modifications of the previously described method and of the previously described configuration are feasible. For example, the separate user device BSW can be omitted if the data processing device BTD is secure against manipulations and, additionally, permits entering the transaction data. In this case an arrangement is involved which is, for example, implemented solely for the special type of transaction. Therefore, for example, no additional user software can be installed and the risk of a manipulation is decreased or excluded.

Figure 4:
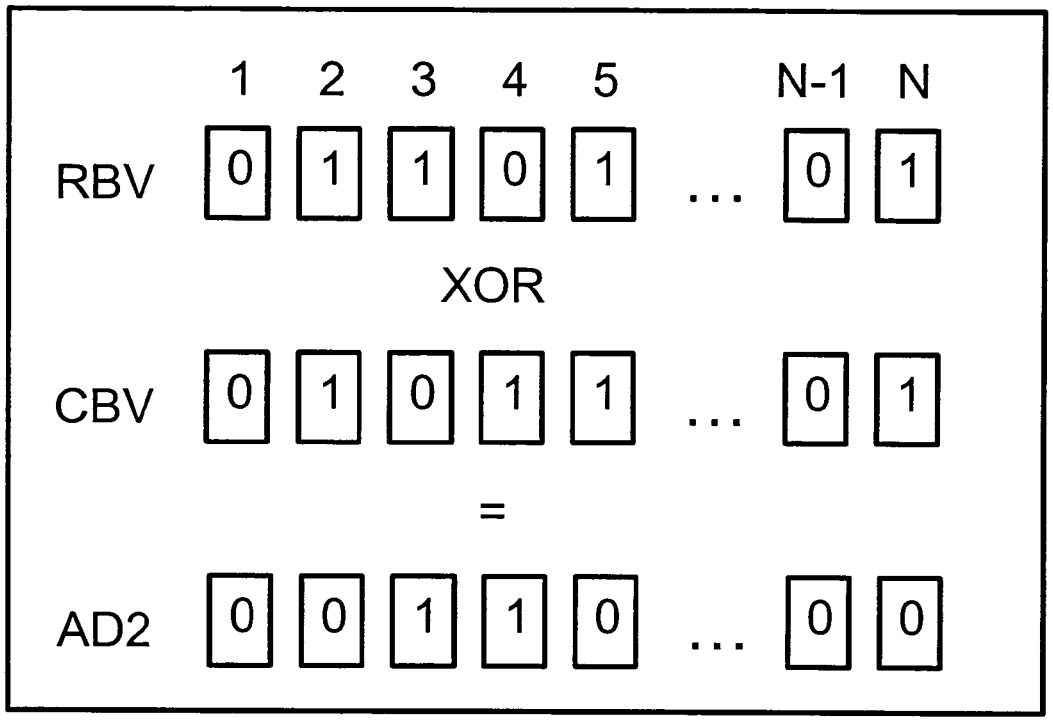

FIG. 4 shows the linkage of two binary vectors. Herein the individual bits of the binary vectors RBV, CBV and AD2 are disposed in rows next to one another and the vectors subjacently. Each of the vectors has N bits, wherein N is a positive integer. The possible bit values "0" and "1" are each depicted in a rectangular box. The binary vector RBV depicted at the top in FIG. 4 is the biometric reference which has been generated from a biometric characteristic of an individual during the enrollment. The binary vector CBV in the middle of FIG. 4 is the binary vector of the secret information that had been subjected to a reverse error correction. The bits corresponding to one another and located at the same positions of the vectors RBV, CBV are linked using the XOR operation to form the result vector AD2. It is evident in the embodiment example that only the bits at positions 3 and 4 were different. At these positions there is a "1" in the result vector AD2. At all other positions is a "0". The result vector AD2 is the reference datum.

Figure 5:
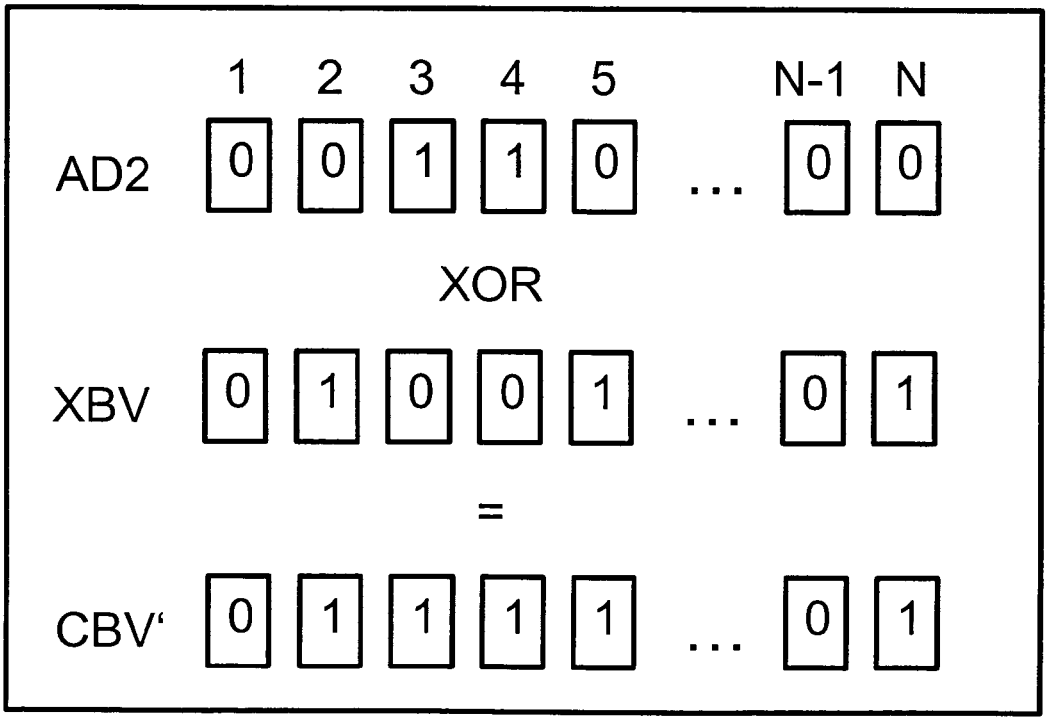

To extract the secret information again, the biometric sample XBV is obtained as binary vector (FIG. 5) for the preparation of the transaction. The binary vector XBV is linked with the binary vector of the reference datum in an XOR operation. As a result is obtained the vector CBV, which only differs from the binary vector CBV of FIG. 4 at the bit positions at which the biometric sample vector XPV differs from the biometric reference information (reference vector RBV). In the embodiment example there is only a discrepancy at the third bit position. The vector CBV therefore differs at the third bit position with the bit value "1" from the bit value "0" at the third bit position of the vector CBV.

This discrepancy between vectors CBV, CBV' is due to said different capture of the same biometric characteristic and is corrected in the subsequent error correction.

In FIGS. 6 to 10 an embodiment example of an error correction method will be described. The example relates to a simple linear block code which, in the specific example of a 6-element bit string, can detect and correct only one bit error. FIG. 6 shows the secret information CBV processed during the enrollment. Due to the variation of the biometric characteristic, during the authentication the secret information could, however, only be reconstructed with one error (at the third position in the bit string). The worked up secret information CBV' reconstructed from the reference datum and the biometric sample is false at this third position. In systematic linear block codes (n, k) n signifies the number of columns, e.g. the length of the binary vectors and k signifies the rows in the generator matrix—see FIG. 7. In systematic block code the message portion is included unchanged into the code words and supplemented by check places (parity block). All vectors of the check matrix (parity check matrix)—not shown—are orthogonal to the generator matrix. A standard matrix can now be constructed, such as is shown in FIG. 8. This matrix is utilized for the decoding (DEC) in the error correction processing unit. If in the biometric transaction a CBV' afflicted with a bit error is reconstructed, the faulty binary vector depicted in FIG. 9 is found in row 5 and column 5 of the standard matrix in FIG. 8. From column 1 in the same row of the standard matrix is obtained the associated error vector which must be used in order to convert CBV' into CBV again—see FIG. 10.

In the following the error correction will be described in greater detail in conjunction with FIGS. 6 to 10. This error correction method is performed, for example, by the decoding device 21 in FIG. 2 or 3. For the sake of simplicity the error correction method will be explained using as an example a binary vector with only 6 bits. However, it is suitable for binary vectors of any length. With the length of the binary vectors only the size of the matrix described in the following changes.

FIG. 6 shows the binary vector CBV generated during the enrollment for example by the coding device 21 in FIG. 1 and supplied to the linkage device 19 in FIG. 1. At the bottom of FIG. 6 is depicted the binary vector CBV' (see for example FIG. 2 and FIG. 3) extracted from the reference datum AD2 by the linkage device 19. As in the embodiment example of FIGS. 4 and 5, the two vectors CBV, CBV' differ only in one bit position, namely the third bit position. While vector CBV at this bit position assumes the value "1", the value of vector CBV' at this position is "0". FIG. 6 shows that, accordingly, by addition of an error vector f that has the same length as the two vectors CBV, CBV', the vector CBV' is obtained through bitwise addition. The embodiment example described in the following is, for the sake of simplicity, not only limited to the length 6 of the binary vectors but also to the case that only the correction of a single bit takes place. If the vectors CBV, CBV' differ at more than one bit position, the error correction does not lead to obtaining the original secret information again. In the embodiment example of the error correction method introduced here the reason is that the method has only available the information for the correction of a single bit position. However, it is also feasible to make available the information for the correction of more than one bit position, for example of two, three or several bit positions such that discrepancies between the vectors CBV, CBV' in more than one bit position is also possible. Independently of the embodiment example described here, it is preferred that the number of bit positions in which the vectors CBV, CBV' are allowed to differ from one another, is specified so that the original secret information can be generated again from the vector CBV' through the error correction method.

FIG. 7 shows a Table with seven columns. The number of seven columns results from the length of six bits in vectors CBV, CBV. The Table in FIG. 7 has one column more than the bit length of the vectors. In the first column are compiled the error vectors f which are at all possible with the specified maximum number of bit position in which the vectors CBV, CBV' can differ from one another. If errors were permitted in more than one bit position, column 1 would be correspondingly longer. In the embodiment example introduced here therefore seven rows result since the error vector f can also occur in which there are no discrepancies between the vectors CBV, CBV' and therefore all bits of error vector are "0".

In the rows to the right next to the error vectors f in FIG. 7 are listed the possible extracted vectors CBV, which, for example, are the result of the linkage of the linkage device 19 in FIG. 2 or 3. In FIG. 9 is schematically depicted the manner in which a unit M generates the error vector f from the extracted vector CBV' utilizing the Table in FIG. 7. In the case depicted here the unit M of the error correction device 21 identifies from the Table in FIG. 7 that the vector CBV' is located at the position of the fifth column and fifth row in the Table in FIG. 7. Therefrom the unit M determines that in the first column of the fifth row the associated error vector f is located which has at the third bit position a "1" and otherwise a "0".

Figure 10:
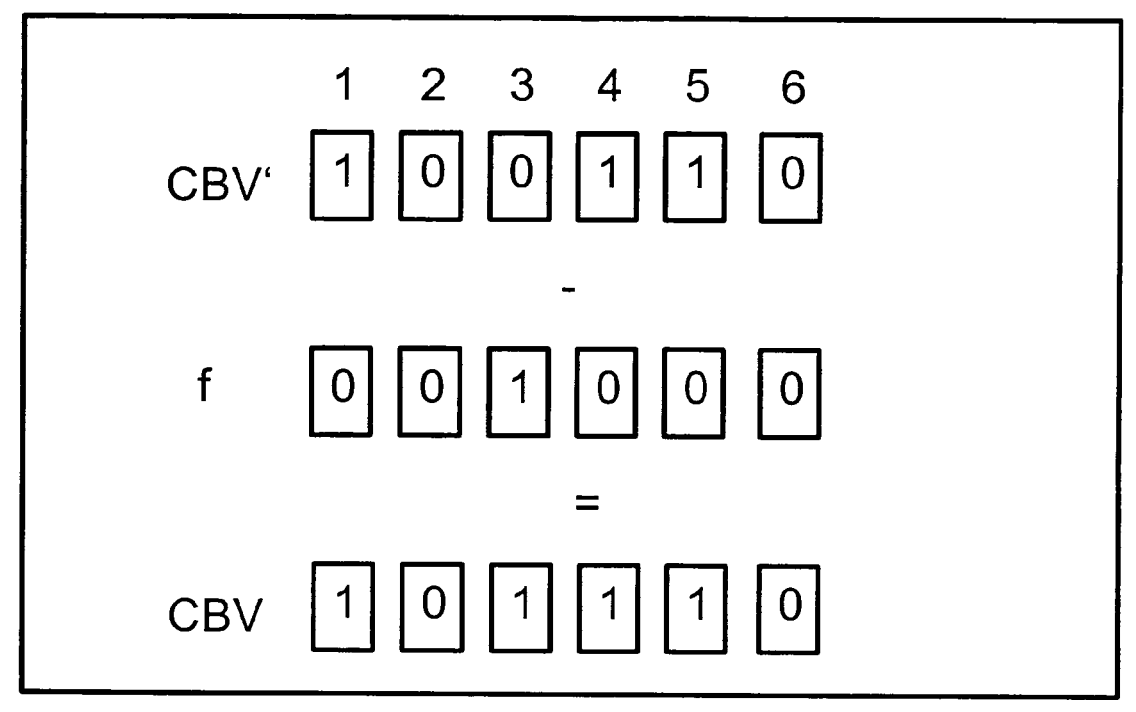

The error correction device now determines by subtraction of the error vector f, that had been identified by the unit M, from the extracted vector CBV' the original secret information, namely the vector CBV (FIG. 10).

The corresponding coding device 21, for example the device 21 in FIG. 1, which during the enrollment prepares the error correction, generates from the original secret information, here for example the vector CBV at the bottom in FIG. 10, the Table in FIG. 7. The device 21 utilizes for this purpose the additional information regarding the number of bit positions at which the subsequently extracted vector CBV' is allowed to differ from vector CBV. From this information and the secret information the coding device 21 generates the Table by listing in column 1 the permissible error vectors and to the right thereof the possible extracted vectors CBV' resulting therefrom, which are still permissible.

It is claimed:

1. A method for transmission of data which are validated by at least one individual (KND), wherein the method comprises the following steps:
   the data (TOR) to be transmitted are at least one of received and generated by an input arrangement (BSW), wherein the input arrangement (BSW) is operatable by the individual,
   the data are transferred by the input arrangement (BSW) to a data processing device (BTD) for processing the data (TOR) for an authenticated data transmission,
   for the purpose of authentication by the individual (KND), by the data processing device (BTD) at least one biometric characteristic of the individual (KND) is captured in order to determine therefrom at least one representation of the characteristic of the individual (KND) and to generate therefrom a feature information as a biometric sample (XBV),
   by the data processing device (BTD) a reference datum (AD2) stored therein is retrieved, wherein the reference datum (AD2) comprises biometric reference information (RBV) which had been linked with a secret information (CBV), wherein the biometric reference information (RBV) had been derived from at least one biometric characteristic of that individual (KND) who is to validate the authenticated data transmission,
   the data processing device (BTD) links the biometric sample (XBV) and the reference datum (AD2) such that, if there is agreement of the biometric reference information (RBV) with the biometric sample (XBV), the secret information (CBV') is extracted from the reference datum (AD2),
   the extracted secret information (CBV') is subjected to an error correction (ECC) in order to correct discrepancies due to biometric characteristics captured in different manner and discrepancies resulting therefore between the biometric sample and the biometric reference information,
   the data (TOR) to be transmitted and the corrected secret information (SBV') are encoded by the data processing device (BTD) using a hash function and, using a sealing function, are linked with one another such that authenticated data (TOS') sealed according to the sealing function are formed, and
   the authenticated data (TOS') are output for the transmission.

2. The method as in claim 1, wherein the output authenticated data (TOS') validated by the individual (KND) are transmitted to a receiving device (OBS), wherein the receiving device (OBS) has available the secret information (PI) encoded with the hash function, wherein the receiving device (OBS) receives the non-authenticated data (TOR) across a parallel path (71), encodes the non-authenticated data (TOR)

using the hash function and links them with the secret information (h(SBV)) already encoded using the hash function in order to obtain thus comparison data, and wherein the receiving device compares the comparison data with the received authenticated data (TOS') and checks the data for agreement.

3. The method as in claim 1, wherein by the data processing device (BTD) using at least one of the secret information (SBV') and using at least a portion of the data (TOR) to be transmitted, a transaction number (TAN) is generated and the transaction number (TAN) is output for the purpose of securing the transmission of the authenticated data (TOS').

4. The method as in claim 3, wherein to at least one of the portion of the data (TOS') to be transmitted and to the secret information (SBV'), first, the hash function is applied and the thus modified data to be transmitted are utilized for the generation of a transaction number (TAN).

5. The method as in claim 1, wherein for the generation of the reference datum (AD2) the secret information (SBV) is subjected by the data processing device (BTD) to an operation, which corresponds to the error correction according to claim 1, wherein the data processing device (BTD), on the basis of at least one biometric characteristic of that individual (KND) who is subsequently to validate data transmissions, generates a biometric reference information and links the biometric reference (RBV) and the secret information (SBV) subjected to the error correction such that the reference datum (AD2) is formed, and the reference datum (AD2) is stored in a store (23) of the data processing device (BTD).

6. A system for the transmission of data which are validated by at least one individual (KND), wherein the system comprises the following:
a data processing device (BTD) for processing the data for the transmission of authenticated data (TOS'),
an input arrangement (BSW) connected with the data processing device (BTD), wherein the input arrangement (BTD) is operable by the individual (KND) in order to at least one of receive and to generate the data (TOR) to be transmitted,
wherein the data processing device (BTD) comprises for the purpose of an authentication by the individual (KND) a capture device implemented for capturing at least one biometric characteristic of the individual (KND) in order to determine therefrom at least one representation of the characteristic of the individual (KND) and to generate therefrom feature information as a biometric sample (XBV) or as a biometric reference information (RBV),
wherein the data processing device (BTD) comprises a data store in which a reference datum (AD2) is stored, wherein the reference datum (AD2) comprises biometric reference information (RBV) that had been linked with a secret information (CBV), wherein the biometric reference information (RBV) had been derived from at least one biometric characteristic of that individual (KND) who is to validate the authenticated data transmission and wherein the data processing device (BTD) is implemented for calling up the reference datum (AD2) from the data store,
wherein the data processing device (BTD) comprises a linkage device implemented for linking the biometric sample (XBV) and the reference datum (AD2) such that, if there is agreement of the biometric reference information with the biometric sample, the secret information (CBV') is extracted from the reference datum (AD2),
wherein the data processing device (BTD) comprises an error correction device implemented for subjecting the extracted secret information (CBV') to an error correction (ECC) to correct discrepancies due to the biometric characteristics having been captured in different manner and discrepancies resulting therefore between the biometric sample (XBV) and the biometric reference information,
wherein the data processing device (BTD) is implemented for receiving the data (TOR) to be transmitted from the input arrangement (BSW), encode the data (TOR) to be transmitted and the corrected secret information (CBV') using a hash function and to link them with one another using a sealing function such that authenticated data sealed according to the sealing function are formed, and to output the authenticated data (TOS') for the transmission.

7. The system as in claim 6, wherein the data processing device (BTD) is implemented for subjecting for the generation of the reference datum (AD2) the secret information (SBV) to an operation which corresponds to the reverse error correction, wherein the data processing device (BTD) is implemented for generating, on the basis of at least one biometric characteristic of that individual (KND) who is later to validate the data transmission, a biometric reference (RBV) and to link the biometric reference and the secret information (CBV) subjected to the reverse error correction with one another such that the reference datum (AD2) is formed and the reference datum is stored in a store (23) of the data processing device (BTD).

8. A system comprising the system as in claim 6 and a receiving device (OBS), wherein the receiving device is connected with the input arrangement (BSW) and the data processing device (BTD), wherein the receiving device comprises a data store (51) in which is stored the secret information (PI) encoded with the hash function, wherein the receiving device (OBS) is implemented for receiving the non-authenticated data across a parallel path (71), to encode the non-authenticated data (TOR) using the hash function and to link them with the secret information already encoded using the hash function in order to obtain thus comparison data, and wherein the receiving device (OBS) is implemented for comparing the comparison data with the received authenticated data (TOS') and to check the data for agreement.

9. A computer program product, comprising:
a non-transitory computer readable medium comprising code to perform the steps of:
capturing, for the purpose of an authentication by the individual (KND), at least one biometric characteristic of the individual (KND) and therefrom determining at least one representation of the characteristic of the individual (KND) and therefrom, generating, a feature information as a biometric sample (XBV),
retrieving, a reference datum (AD2), wherein the reference datum comprises a biometric reference information (RBV) that had been linked with secret information (CBV), wherein the biometric reference information had been derived from at least one biometric characteristic of that individual who is to validate the authenticated data transmission,
linking the biometric sample (XBV) and the reference datum (AD2) such that, if there is agreement of the biometric reference information with the biometric sample (XBV), the secret information (CBV') is extracted from the reference datum,
subjecting the extracted secret information (CBV') to an error correction in order to correct discrepancies due to biometric characteristics having been captured in different manner and the discrepancies resulting therefore between biometric sample (XBV) and biometric reference information (RBV), encoding the data (TOR) to be transmitted and the corrected secret information (SBV') using a hash function and, using a sealing function, linking the data (TOR) and the corrected secret information (SBV') such that authenticated data (TOS') sealed according to the sealing function are formed, and outputting the authenticated data (TOS') for transmission.

* * * * *